(12) United States Patent
Chen et al.

(10) Patent No.: US 11,825,037 B2
(45) Date of Patent: Nov. 21, 2023

(54) MULTI-MODE SCANNING DEVICE PERFORMING INVISIBLE LIGHT REFLECTION

(71) Applicant: AVISION INC., Hsinchu (TW)

(72) Inventors: Yen-Cheng Chen, Baoshan Township, Hsinchu County (TW); Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 307 days.

(21) Appl. No.: 17/492,193

(22) Filed: Oct. 1, 2021

(65) Prior Publication Data

US 2022/0124204 A1    Apr. 21, 2022

(30) Foreign Application Priority Data

Oct. 16, 2020 (TW) ................................ 109135936

(51) Int. Cl.
*H04N 1/00* (2006.01)

(52) U.S. Cl.
CPC ..... *H04N 1/00005* (2013.01); *H04N 1/00087* (2013.01)

(58) Field of Classification Search
None
See application file for complete search history.

(56) References Cited

U.S. PATENT DOCUMENTS

2016/0100075 A1    4/2016  Chen
2016/0173721 A1*   6/2016  Sheng ................ H04N 1/00018
                                                      358/1.14

FOREIGN PATENT DOCUMENTS

TW         M495685 U      2/2015
TW         I543581 B      7/2016

* cited by examiner

*Primary Examiner* — Helen Zong
(74) *Attorney, Agent, or Firm* — Muncy, Geissler, Olds & Lowe, P.C.

(57) ABSTRACT

A multi-mode scanning device for scanning an original includes a background element, a first light source, a second light source and an optical module. The first light source outputs visible light to irradiate the background element and the original to generate first light and second light, respectively. The second light source outputs invisible light to irradiate a combination of the background element and the original to generate third light and fourth light, wherein the background element reflects the invisible light. The optical module receives the first to fourth light and generates sensing signals representative of visible light information and invisible light information of the original. The original is disposed between the background element and the optical module. The first light source, the second light source and the optical module are disposed on a same side of the background element.

11 Claims, 4 Drawing Sheets

MULTI-MODE SCANNING DEVICE PERFORMING INVISIBLE LIGHT REFLECTION

CROSS-REFERENCE TO RELATED APPLICATIONS

This application claims priority of No. 109135936 filed in Taiwan R.O.C. on Oct. 16, 2020 under 35 USC 119, the entire content of which is hereby incorporated by reference.

BACKGROUND OF THE INVENTION

Field of the Invention

This disclosure relates to a multi-mode scanning device performing invisible light reflection, and more particularly to a multi-mode scanning device of using a background element to transmit invisible light and using the background element to reflect visible light to perform the invisible light reflection.

Description of the Related Art

After a conventional scanner has scanned a document having holes, the obtained visible light image has fully black areas corresponding to the holes. If this image is printed out, then a lot of toner is wasted in printing the full black hole images. At present, the copier on the market directly prints the fully black hole images. Although the hole images can be removed using image processing software, such the post-processing is not precise and occupies the substantial performance, thereby wasting the user's time and hindering the user, who is unfamiliar with the computer, from using such technology.

On the other hand, a preview scan can be performed to set the cropping boundary and prevent the holes or cracks from being scanned. However, if the information beside the holes is not scanned, the scanned result may become incomplete, and such the operation method also becomes very complicated.

At present, the requirement of the user on the functions of the scanner or multi-function peripheral gradually increases. Thus, how to provide a scanning device having the function of scanning a visible light image of a document as well as obtaining the contour information, or even inpainting the hole image is indeed a problem to be solved by this disclosure.

BRIEF SUMMARY OF THE INVENTION

It is therefore an objective of this disclosure to provide a multi-mode scanning device performing invisible light reflection to have a function of scanning a visible light image of a document, to obtain invisible light (contour) information using a calibration element, needed for obtaining the visible light image, in conjunction with an invisible light source, and even to inpaint a hole image.

To achieve the above-identified object, this disclosure provides a multi-mode scanning device for scanning an original. The multi-mode scanning device includes: a background element; a first light source outputting visible light to irradiate the background element and the original to generate first light and second light, respectively; a second light source outputting invisible light to irradiate a combination of the background element and the original to generate third light and fourth light, wherein the background element reflects the invisible light; and an optical module receiving the first light, the second light, the third light and the fourth light and generating sensing signals representative of visible light information and contour information of the original. The original is disposed between the background element and the optical module, and the first light source, the second light source and the optical module are disposed on a same side of the background element.

With the above-mentioned embodiment, it is possible to provide a multi-mode scanning device performing invisible light reflection to have a function of scanning a visible light image of a document, to obtain invisible light (contour) information using a calibration element, needed for obtaining the visible light image, in conjunction with an invisible light source, and even to inpaint a hole image. This disclosure adopts the background element to provide the background reference and the contour information acquiring function concurrently, wherein the background element transmits the invisible light, and the background element reflects the visible light. This is advantageous to the development of the image scanning and image inpainting.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

The following structures of all the examples may be properly combined, replaced and modified to achieve the effects of this disclosure.

At present, required functions of users on a scanner or multi-function peripheral gradually increase, and users wish to obtain a visible light image of a document using an ordinary scanner or multi-function peripheral. More preferably, the user may wish to inpaint the hole image or even obtain contour information of the document.

Figure 1A:
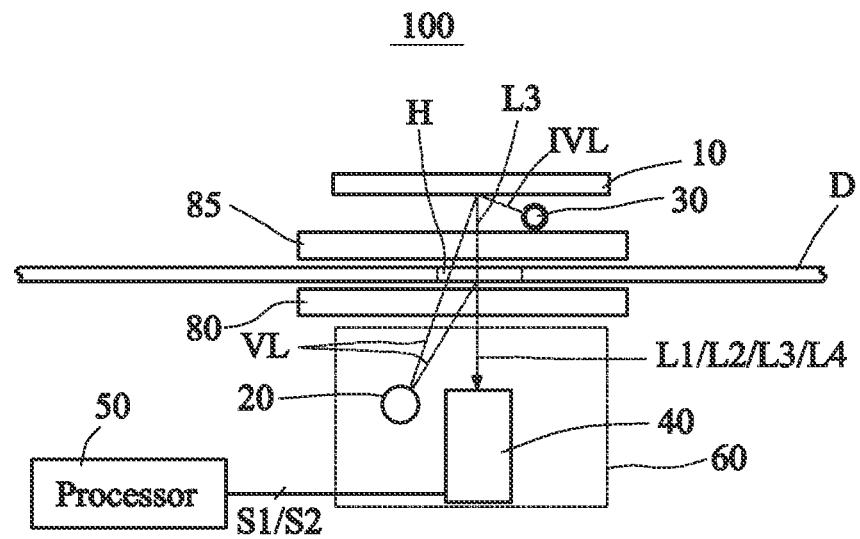
FIG. 1A is a schematic view showing a scanning device according to a preferred embodiment of this disclosure.
Figure 1B:
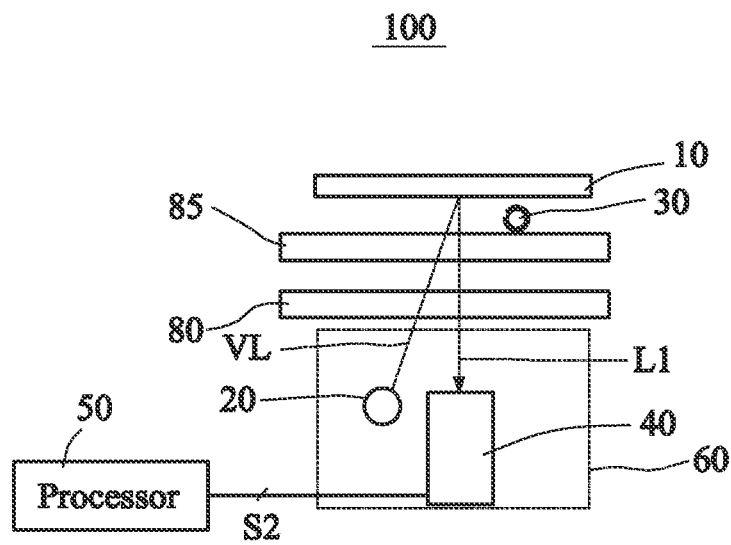
FIG. 1B is a schematic view showing the scanning device of FIG. 1A performing visible light image scanning.
Figure 1C:
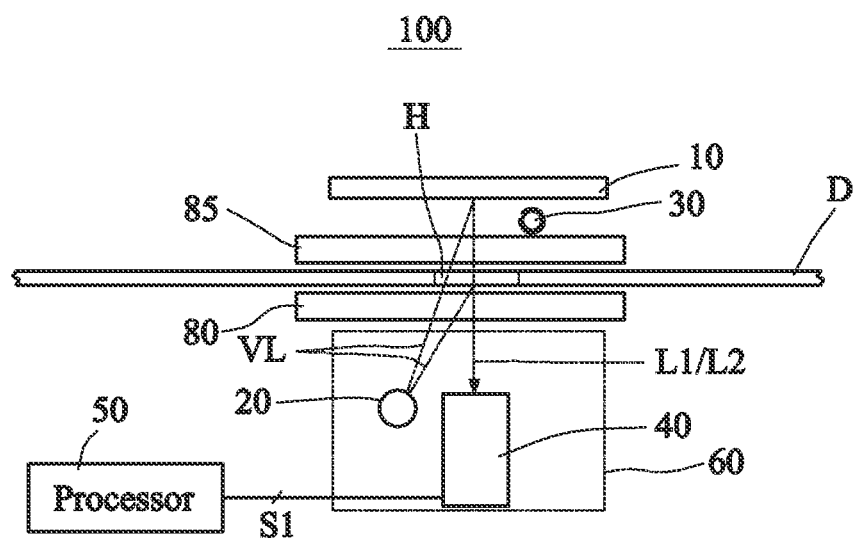
FIG. 1C is a schematic view showing the scanning device of FIG. 1A performing visible light calibrating.
Figure 1D:
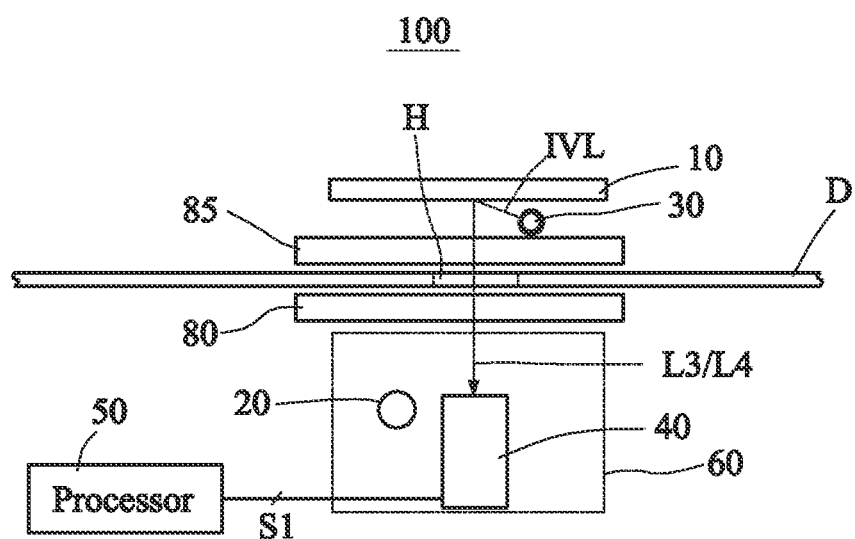
FIG. 1D is a schematic view showing the scanning device of FIG. 1A performing invisible light image scanning.

FIG. 1A is a schematic view showing a scanning device according to a preferred embodiment of this disclosure. FIGS. 1B to 1D are schematic views showing the scanning device of FIG. 1A performing visible light image scanning, visible light calibrating and invisible light image scanning, respectively. Because modes of visible light scanning, invisible light scanning and the like can be performed, the scanning device of this embodiment may be referred to as a multi-mode scanning device. Referring to FIGS. 1A to 1D, a multi-mode scanning device 100 for scanning an original D includes a background element 10, a first light source 20, a second light source 30 and an optical module 40, The above-mentioned architecture is applicable to sheet-fed and flatbed original scanning. Light-permeable platens 85 and 80 may be provided on top and bottom sides of the original D to protect the background element 10 and the optical module 40 from being interfered by foreign matters brought by the original D.

The background element 10, which is not a mirror in the embodiment, is a calibration element disposed opposite the optical module 40. The first light source 20 outputs visible light VL to irradiate the background element 10 and the original D to generate first light L1 and second light L2, respectively. The second light source 30 outputs invisible light IVL to irradiate a combination of the background element 10 and the original D to generate third light L3 and fourth light L4. The second light source 30 emits the invisible light IVL in an upward inclined direction. The background element 10 reflects the invisible light IVL downloads. The optical module 40 receives the first light L1, the second light L2, the third light L3 and the fourth light L4 and generates sensing signals S1. Thus, visible light information representative of the original D and invisible light information representative of a high-contrast contour of the original D can be determined according to the sensing signals S1. In this embodiment, the original D is disposed between the background element 10 and the optical module 40, and the first light source 20, the second light source 30 and the optical module 40 are disposed on a same side of the background element 10. In this embodiment, the second light source 30 is closer to the background element 10 than the first light source 20, and optical paths of the third light L3 and the fourth light L4 from the background element 10 to the optical module 40 are substantially perpendicular to a reflective surface of the background element 10.

According to the above-mentioned architecture, it is possible to achieve the effect of this disclosure and to have a function of scanning a visible light image of a document, to obtain invisible light (contour) information using a calibration element, needed for obtaining the visible light image, in conjunction with an invisible light source, and even to inpaint a hole image. The above-mentioned architecture is different from the conventional film scanner, which is a dedicated machine having the defect inpainting function, and does not have a background element functioning as the background of the invisible light for reflecting the invisible light reflection.

It is worth noting that a visible light source and the invisible light source can be turned on upon scanning, so that visible light receiver units and invisible light receiver units of the optical module 40 obtain the visible light and invisible light signals in a time-sharing manner. Also, the visible light and invisible light sources may be turned on in a time-sharing manner to perform the time-sharing scan.

The multi-mode scanning device 100 may further include a processor 50. In a calibration mode, the first light source 20 outputs the visible light VL to irradiate the background element 10 to generate the first light L1 (see FIG. 1B), the optical module 40 receives the first light L1 and generates a calibration signal S2, and the processor 50 performs the optical calibration according to the calibration signal S2. That is, the background element 10 is used to perform the standard white (or standard color) optical calibration (including the brightness calibration). In one example, the steps of inpainting the hole image and obtaining the contour information of the document are performed in the processor 50. In another example, the steps of inpainting the hole image and obtaining the contour information of the document are performed in a computer, peripheral or server (not shown) connected to the multi-mode scanning device 100.

For the sake of explanation, the first light L1 and the second light L2 are firstly defined. The visible light VL penetrates through a hole H of the original D to irradiate the background element 10 to generate the first light L1 (see FIG. 1A or 1C). That is, the visible light VL directly irradiates the background element 10, and is then reflected by the background element 10 to generate the first light L1. In the calibration mode, no original D is present, and the first light L1 is also generated (see FIG. 1B). When the original D is present, the visible light VL directly penetrates through the hole H to irradiate the background element 10, and the first light L1 is also generated (see FIG. 1C). On the other hand, when the original D is present, the visible light VL irradiates the portion (hole-free portion, also referred to as a physical portion) other than the hole H of the original D to generate the second light L2. That is, the visible light VL is directly reflected by the original D to generate the second light L2 (see FIG. 1C). It is worth noting that when the original D has the higher transmission rate, the visible light VL may also penetrate through the original D and is reflected by the background element 10 and then penetrate through the original to generate the light, which may also be named as the second light L2.

Referring to FIGS. 1A and 1D, the second light source 30 and the optical module 40 are disposed on the bottom side of the background element 10, and the invisible light IVL irradiates a combination of the background element 10 and the original D to generate the third light L3 and the fourth light L4. The invisible light IVL coming from the second light source 30 is reflected by the background element 10 to generate the fourth light L4, which penetrates through the portion (hole-free portion or physical portion) other than the hole H of the original D to generate the third light L3. The fourth light L4 directly penetrates through the hole H of the original a Because the hole H is fully light-permeable and cannot block any invisible light IVL, the intensity of the invisible light IVL is decreased by only the physical portion of the original D, so that the hole portion and the hole-free portion can be clearly distinguished from each other. Therefore, the information of the hole H can be clearly obtained, and the contour information of the original D can also be obtained at the same time. The invisible light IVL includes, without limitation to, ultra-violet light, infrared light, far infrared light and the like. In FIG. 1A, the combination of the first light source 20 and the optical module 40 may be referred to as a scanning module 60.

Figure 2:
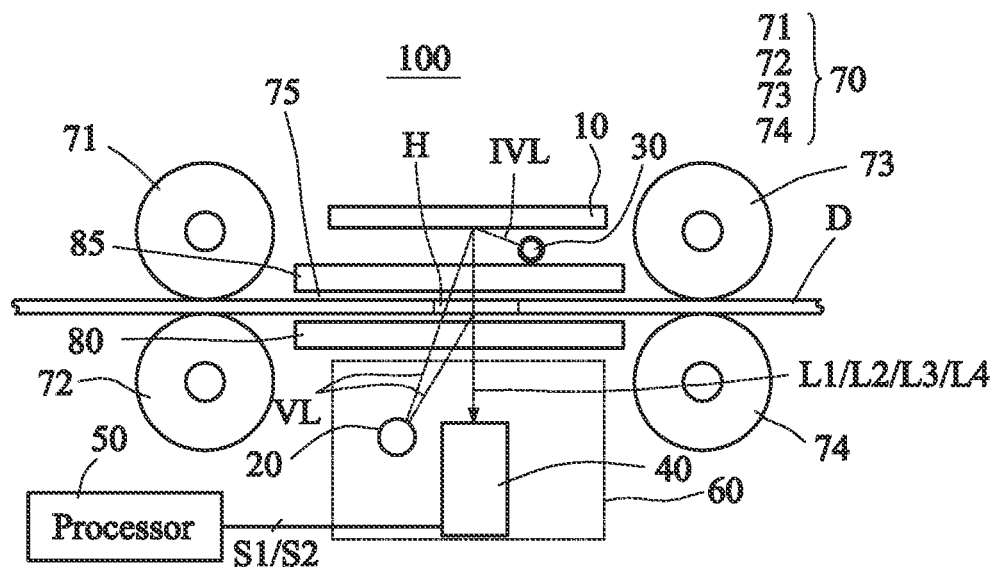
FIG. 2 is a schematic view showing a scanning device of a first modified example of FIG. 1A.

FIG. 2 is a schematic view showing a scanning device of a first modified example of FIG. 1A. Referring to FIG. 2, a multi-mode scanning device 100 further includes a transporting mechanism 70 transporting the original D past a sheet passage 75 between the background element 10 and the optical module 40. The light-permeable platens 85 and 80 form the sheet passage 75. The second light source 30 is disposed between the background element 10 and a combination of the light-permeable platens 80 and 85. As shown in FIG. 2, the second light source 30 is disposed between the background element 10 and the light-permeable platen 85, or may be regarded as being disposed between the background element 10 and the original D. The transporting mechanism 70 includes rollers 71, 72, 73 and 74. With the above-mentioned structures, the sheet-fed original scanning can be performed.

Figure 3:
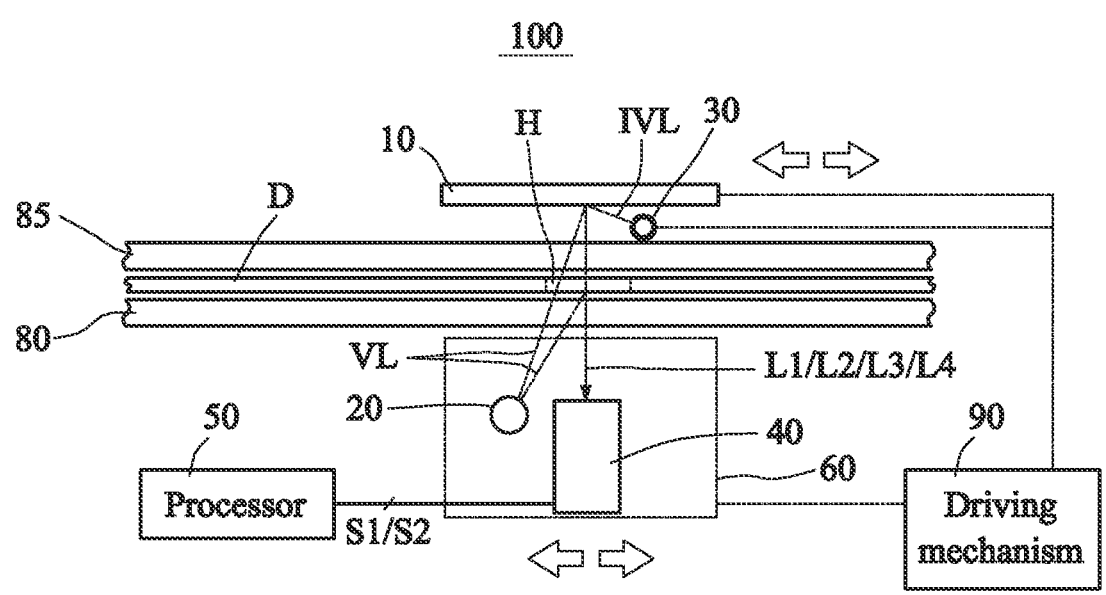
FIG. 3 is a schematic view showing a scanning device of a second modified example of FIG. 1A.

FIG. 3 is a schematic view showing a scanning device of a second modified example of FIG. 1A. Referring to FIG. 3, this modified example provides a multi-mode scanning device 100, which performs invisible light reflection to scan the original D, and includes the background element 10, the light-permeable platen 80, the first light source 20, the second light source 30 and the optical module 40. The light-permeable platen 80 supports the original D to make the original D be located between the light-permeable platen 80 and the background element 10. It is worth noting that the light-permeable platen 85, which has been depicted, may also be omitted according to some conditions. The first light source 20 outputs the visible light VL to irradiate the background element 10 and the original D to generate the first light L1 and the second light L2, respectively. The second light source 30 outputs invisible light IVL to irradiate a combination of the background element 10 and the original D to generate third light L3 and fourth light L4. The optical module 40 is movably disposed and receives the first light L1, the second light L2, the third light L3 and the fourth light L4, and thus generates the sensing signals S1. Thus, the visible light information representative of the original D and the contour information of the original D can be obtained according to the sensing signals S1. The original D is disposed between the background element 10 and the optical module 40. The first light source 20, the second light source 30 and the optical module 40 are disposed on the same side of the background element 10. In this example, the flatbed scanning can be implemented, wherein the first light source 20, the second light source 30, the optical module 40 and the background element 10 are movable, while the original D is stationary. The first light source 20 and the second light source 30 are linear light sources. In addition, the multi-mode scanning device 100 further includes a driving mechanism 90 for driving the first light source 20, the second light source 30, the optical module 40 and the background element 10 to move relatively to the stationary original D and light-permeable platen 80. The background element 10 is separated from the original D by a distance.

Figure 4:
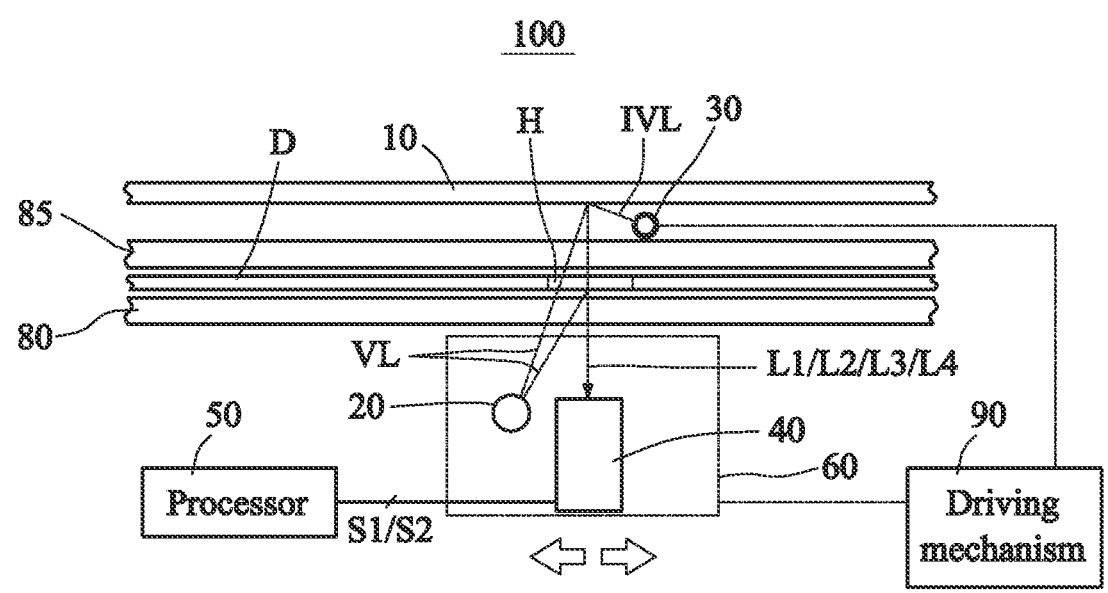
FIG. 4 is a schematic view showing a flatbed scanning device of a third modified example of FIG. 1A.

FIG. 4 is a schematic view showing a flatbed scanning device of a third modified example of FIG. 1. The example of FIG. 4 is similar to FIG. 3 except for the difference that the driving mechanism 90 drives the first light source 20, the second light source 30 and the optical module 40 to move relatively to the stationary original and background element 10. In this example, the flatbed scanning can be implemented, wherein the cover range of the background element 10 is larger than or equal to the scanning range of the scanning device.

With the above-mentioned embodiment, it is possible to provide a multi-mode scanning device performing invisible light reflection to have a function of scanning a visible light image of a document, to obtain invisible light (contour) information using a calibration element, needed for obtaining the visible light image, in conjunction with an invisible light source, and even to inpaint a hole image. According to the prior art, the background element (especially the background element for calibration) is not used to reflect the invisible light for the acquiring of the contour information. This disclosure overcomes the partial opinion of the prior art, and adopts the background element to provide the background reference and the contour information acquiring function concurrently, wherein the background element transmits the invisible light, and the background element reflects the visible light. This is advantageous to the development of the image scanning and image inpainting.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A multi-mode scanning device for scanning an original, the multi-mode scanning device comprising:
   a background element;
   a first light source outputting visible light to irradiate the background element and the original to generate first light and second light, respectively;
   a second light source outputting invisible light to irradiate a combination of the background element and the original to generate third light and fourth light, wherein the background element reflects the invisible light; and
   an optical module receiving the first light, the second light, the third light and the fourth light and generating sensing signals representative of visible light information and contour information of the original, wherein the original is disposed between the background element and the optical module, and the first light source, the second light source and the optical module are disposed on a same side of the background element.

2. The multi-mode scanning device according to claim 1, further comprising a processor, wherein the background element is a calibration element, and in a calibration mode, the first light source outputs the visible light to irradiate the background element to generate the first light, the optical module receives the first light and generates a calibration signal, and the processor performs an optical calibration according to the calibration signal.

3. The multi-mode scanning device according to claim 1, wherein the invisible light coming from the second light source is reflected by the background element to generate the fourth light, the fourth light penetrates through a physical portion of the original to generate the third light, and the fourth light directly penetrates through a hole of the original.

4. The multi-mode scanning device according to claim 1, further comprising a transporting mechanism transporting the original past a sheet passage between the background element and the optical module.

5. The multi-mode scanning device according to claim 4, further comprising two light-permeable platens, which form the sheet passage.

6. The multi-mode scanning device according to claim 5, wherein the second light source is disposed between the background element and a combination of the two light-permeable platens.

7. The multi-mode scanning device according to claim 1, wherein the visible light penetrates through a hole of the original to irradiate the background element to generate the first light, and the visible light irradiates a portion other then the hole of the original to generate the second light.

8. The multi-mode scanning device according to claim 1, wherein the second light source is disposed between the background element and the original.

9. The multi-mode scanning device according to claim 1, further comprising:
   a light-permeable platen supporting the original; and
   a driving mechanism driving the first light source, the second light source, the optical module and the background element to move relatively to the original.

10. The multi-mode scanning device according to claim 1, further comprising:
   a light-permeable platen supporting the original; and
   a driving mechanism driving the first light source, the second light source and the optical module to move relatively to the original and the background element.

11. The multi-mode scanning device according to claim 1, wherein the second light source is closer to the background element than the first light source, and optical paths of the third light and the fourth light from the background element to the optical module are substantially perpendicular to a reflective surface of the background element.

* * * * *